United States Patent [19]

Plunkett

[11] Patent Number: 4,928,043
[45] Date of Patent: May 22, 1990

[54] BACK EMF SAMPLING CIRCUIT FOR PHASE LOCKED LOOP MOTOR CONTROL
[75] Inventor: Allan B. Plunkett, Portland, Oreg.
[73] Assignee: Synektron Corporation, Portland, Oreg.
[21] Appl. No.: 270,611
[22] Filed: Nov. 14, 1988
[51] Int. Cl.⁵ .............................................. H02R 6/02
[52] U.S. Cl. ................................... 318/254; 318/721
[58] Field of Search ................... 318/254, 254 A, 255, 318/500, 615, 596, 628, 661, 721–723, 138, 139, 439, 717, 718, 724, 529, 638

[56] References Cited
U.S. PATENT DOCUMENTS

| | | | |
|---|---|---|---|
| 4,275,343 | 6/1981 | Fulton et al. | 318/721 |
| 4,455,513 | 6/1984 | Fulton et al. | 318/254 X |
| 4,513,230 | 4/1985 | Erdman | 318/254 |
| 4,642,537 | 2/1987 | Young | 318/254 |
| 4,673,849 | 6/1987 | Sears et al. | 318/254 X |
| 4,743,815 | 5/1988 | Gee et al. | 318/254 |
| 4,757,241 | 7/1988 | Young | 318/254 |

Primary Examiner—William M. Shoop, Jr.
Assistant Examiner—A. Jonathan Wysocki
Attorney, Agent, or Firm—Chernoff, Vilhauer, McClung & Stenzel

[57] ABSTRACT

A sensorless control for DC permanent magnet brushless motor includes a feedback loop connected between the motor stator windings and the inverter which controls the timer at which current is provided to the various windings in sequence. The control of the invention includes a voltage sensing network for sensing the back EMF on each motor winding when it is unenergized and comparing this voltage with a null point. For maximum torque this voltage has an optimum value and variation from this value produces an error signal which is integrated to produce a VCO drive signal. This signal controls the frequency of a VCO which in turn controls the switching times of the inverter.

11 Claims, 8 Drawing Sheets

BACK EMF SAMPLING CIRCUIT FOR PHASE LOCKED LOOP MOTOR CONTROL

The following invention relates to a DC permanent magnet motor of the brushless type which includes a sensorless control for maintaining the proper timing of the multiphase inverter driving the motor.

BACKGROUND OF THE INVENTION

Brushless DC motors which are driven by an inverter frequently include feedback controls for maintaining a desired phase angle relationship between the position of the rotor and the stator as each winding is energized. For example, it is frequently desired to energize a winding so as to maintain the maximum amount of torque output for the motor at any given speed. This requires that the windings be energized when the rotor is in some predetermined position with respect to the stator windings.

The torque output is at a maximum when the stator current position, as determined by its driving inverter, is at an angle of 90° with respect to the magnet flux position. The magnets here are assumed to be mounted on the rotor which is directly connected to the output shaft. Thus, to maintain the torque at maximum, the current must be switched sequentially in step with magnet rotation and at specific times. However, the maximum torque position at this 90° phase angle is an unstable point. If a deviation from the 90° position occurs, the torque declines and there is no restoring torque to regain alignment. Therefore, some type of feedback is necessary.

Since varying the inverter switching angle from the optimum position only reduces the torque, the motor speed control must be done by another means which can both increase and reduce torque. Typically, some type of stator voltage control method is used similar to that used in a conventional DC mechanical commutator motor.

Conventionally, many DC motors of this type employ external sensors such as Hall effect sensors or inductors to measure the flux and to provide a signal to the inverter to switch to the next phase in sequence when the flux reaches a predetermined threshhold. Examples of U.S. patents that employ such external sensors can be found in LaFuze No. 4,295,085, Abraham No. 3,601,678, Pawletco No. 3,518,516 and Fertig No. 3,483,457. The problem with such external sensors is that as the motors become smaller, there is less space available for mounting.

Since the windings in such motors are switched on in sequence, there will, at times, be at least one winding which is completely unenergized. In the past, systems have been proposed in which the back emf across such unenergized windings is sensed in order to provide a switching signal for the commutator. An example of such a motor is shown in Wright U.S. Pat. No. 4,162,435. In this device, the back emf induced across an unenergized winding is sensed and this voltage is fed to an integrator. When the output of the integrator reaches a preset reference point, a signal is provided which enables the inverter to switch, energizing the next winding of the motor. The back emf is sequentially sensed on all of the motor windings in turn so that the integrated output provides the switching signals for energizing each of the windings in turn. The problem with such a system is that the switching signals for the inverter are entirely dependent upon sensing each back emf of each unenergized winding. If even one such signal is missed, the motor control becomes lost with no means of recovery. Devices that take an approach similar to that shown in Wright, are shown in the U.S. Pat. No. 4,172,050 to Nagasawa and Alley et al. U.S. Pat. No. 4,250,435. Also similar in concept are U.S. Pats. No. 4,401,934 to Dolland et al. and Dolland U.S. Pat. No. 4,394,610.

In yet another type of motor, as shown in Alley et al. U.S. Pat. No. 4,250,435, rotor position is sensed when the back emf across an unenergized winding integrated over a predetermined time period reaches a threshhold as measured in a comparator. This provides a clock signal that is compared in a phase comparator with a second clock signal that represents desired rotor position for a particular speed. Any variation in time between the two clock signals limits the amount of current supplied to a particular winding when it is energized. If the actual rotor position leads the desired rotor position, less current is supplied to the winding. More current is supplied to the winding if the actual rotor position lags the desired rotor position. By varying the current supplied to the motor, the speed of the motor can be regulated. Note that the position of the rotor with respect to the inverter switching must be controlled by another circuit. This is a relatively complex system that depends upon the presence of an error clock pulse signal each time a winding is energized to maintain the proper speed.

Still other types of systems rely upon auxiliary sensing coils to develop voltages representative of desired rotor position. As mentioned previously in connection with other devices which may use Hall effect sensors and the like, the use of auxiliary coils is not practical in very small motor systems. Examples of these types of motors include U.S. Pats. No. 4,266,432, to Schroeder et al., Fulton et al. U.S. Pat. No. 4,275,343, Fulton U.S. Pat. No. 4,455,513, D'Atre et al. U.S. Pat. No. 4,088,934 and D'Atre et al. U.S. Pat. No. 4,088,935.

SUMMARY OF THE INVENTION

The present invention provides a simple and effective means of stabilizing a brushless DC motor without the need for external or auxiliary sensors by providing an error signal, derived from the back emf of unenergized motor windings, representing variations in rotor position from an optimal rotor position. This signal is integrated and applied to a voltage controlled oscillator, which, in turn, controls the frequency at which the motor's inverter sequentially energizes the stator windings.

In accordance with the invention, a brushless electrical rotary machine is provided having a rotor and a stator including a plurality of windings driven by a multiphase inverter for selectively energizing the windings in sequence. Connected to the output of the windings is a sampling network for sampling the back emf on at least one of the windings during a period of time when the winding is not energized. This voltage sample is the motor voltage during the time the motor emf makes the transition from one of the DC bus potentials to the other. The average value of this sample is zero when the motor rotor is correctly aligned with the inverter. This voltage sample produces a signal which is supplied to an error amplifier whose output is connected to a voltage controlled oscillator. The voltage controlled oscillator controls the frequency and phase angle at which the multiphase inverter selectively energizes the windings.

The sampling network includes a switching circuit coupled to the inverter for connecting an unenergized winding to the voltage sampling network during the period of time when it is unenergized. The error amplifier may also include a proportional gain amplifier for stabilizing the loop at high frequencies and an integrator which causes the average value of the error voltage to be zero in steady state. The voltage sensing network includes inputs from all of the windings proportionately scaled so that the unenergized winding is measured against an artificially constructed null point.

Another aspect of the invention includes a starter network which aligns the stator relative to the rotor such that the stator flux produces maximum torque when the stator windings are first energized. Shortly after the stator and rotor have been so aligned, a start signal generator generates a pulse which is coupled into the integrator. The integrator ramps upward so as to steadily increase the frequency of the voltage controlled oscillator for a predetermined period of time, and then a switch connects it to the feedback loop for steady-state operation. At this point, back emf signals generated by rotation of the motor are sufficient to continue to drive the voltage controlled oscillator.

In one embodiment of the invention, the back emf is sensed across a single winding during its unenergized state and the voltage is integrated over this same time interval. However, since the windings are energized in sequence, it is possible to provide a preferred embodiment of the invention in which each winding is sampled sequentially during the time when it is unenergized so that each winding is sampled during a period of time comprising a fraction of each revolution of the motor.

Since the integrator in the error amplifier has an inherent memory, the failure of the sampling network during any one sampling period is not critical, and the integrator will continue to provide an output signal to the voltage controlled oscillator during such periods.

It is a principal object of this invention to provide a DC brushless motor having an inverter controlled by a sensorless feedback network to produce maximum motor torque at any speed.

A further object of this invention is to control the switching frequency of an inverter for a brushless DC motor with a network that includes inherent memory to provide stabilization so that the loss of one or more rotor position sensing signals will not adversely affect performance.

A still further object of this invention is to provide an automatic starter circuit for a DC brushless motor that aligns the rotor and stator and quickly accelerates the motor to a desired speed.

The foregoing and other objectives, features and advantages of the invention will be more readily understood upon consideration of the following detailed description of the invention, taken in conjunction with the accompanying drawings.

DETAILED DESCRIPTION OF THE INVENTION

Figure 1:
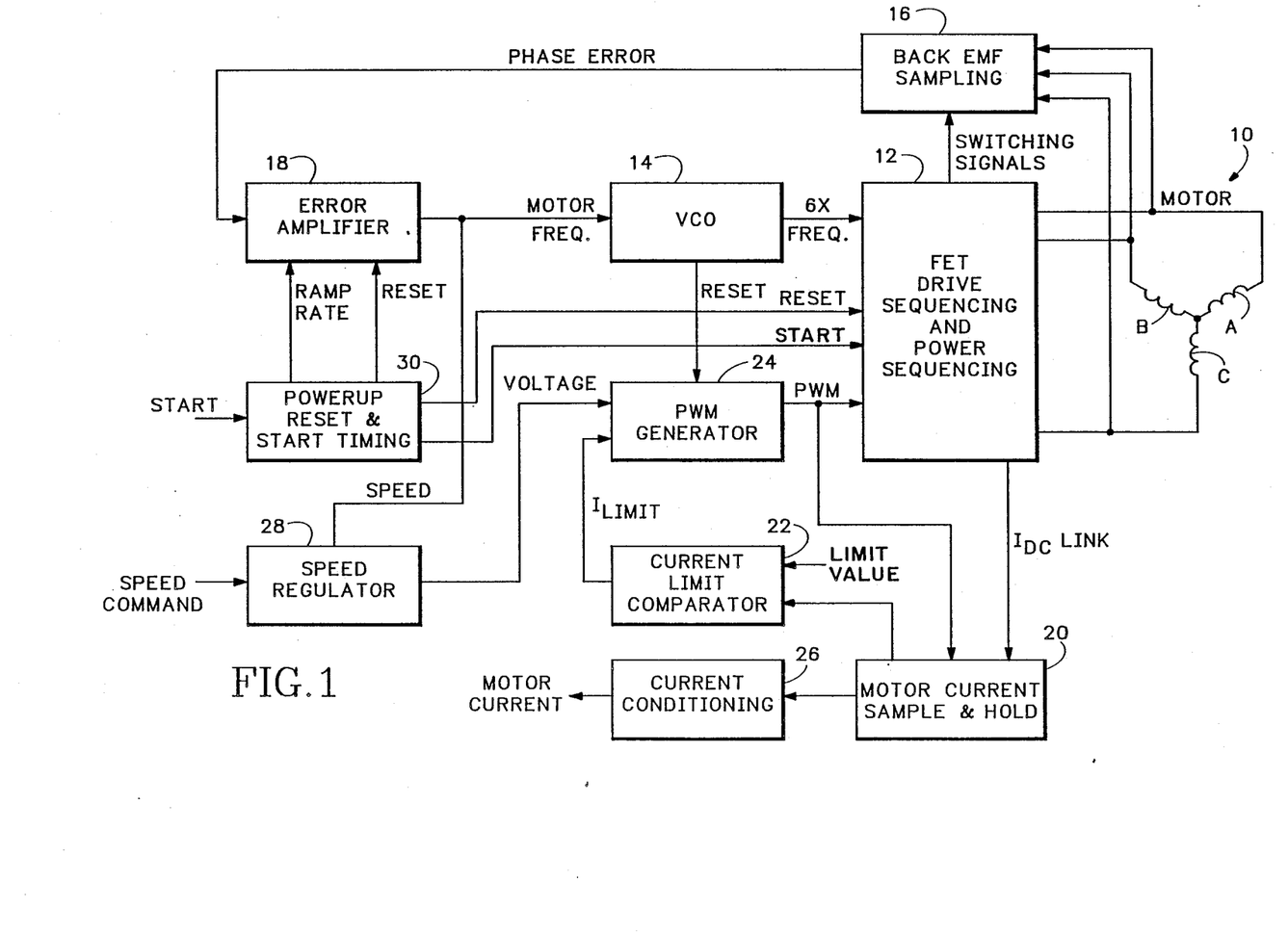
FIG. 1 is a block schematic diagram of a motor frequency control utilizing the current invention.

A DC brushless motor 10 is a three phase motor which includes motor windings A, B and C. The motor 10 is driven by a FET drive sequencing and power sequencing network 12 whose frequency is controlled by a voltage controlled oscillator (VCO) 14. A signal which controls the frequency of the VCO 14 is derived from a back emf sampling network 16 connected to each of the motor windings A, B and C. The sampling network 16 samples the back emf across each of the windings A, B and C as they reach their unenergized states and feeds this information to an error amplifier 18 which amplifies and integrates the error signal, provides gain, and then generates a motor frequency signal for the VCO 14. The VCO 14, in turn, drives the FET drive circuit 12 energizing the motor windings A, B and C in sequence.

Speed control is provided in the conventional manner. A motor current sample and hold circuit 20 samples current through the windings A, B and C. These current samples are compared to a limit value in a comparator 22 and provided to a pulse width modulation (PWM) generator 24 which controls the average voltage switched to each of the windings A, B and C. Motor current may also be provided at a test point by a current conditioning circuit 26. The motor speed is directly related to the VCO frequency which in turn is controlled by error amplifier 18. Thus, a speed signal may be provided to a conventional speed regulator circuit 28 which provides a voltage to the PWM generator 24.

An automatic powerup, reset and start timing circuit 30 aligns the stator and rotor with a reset command and provides a timed pulse signal to error amplifier 18 to cause it to generate a ramp and thereby accelerate the motor to a desired speed. In this way, the motor is self-starting and very quickly reaches the desired speed while delivering maximum torque. This is important in motors such as disk drive motors that are frequently stopped and started, and which must operate at one speed.

Figure 2A:
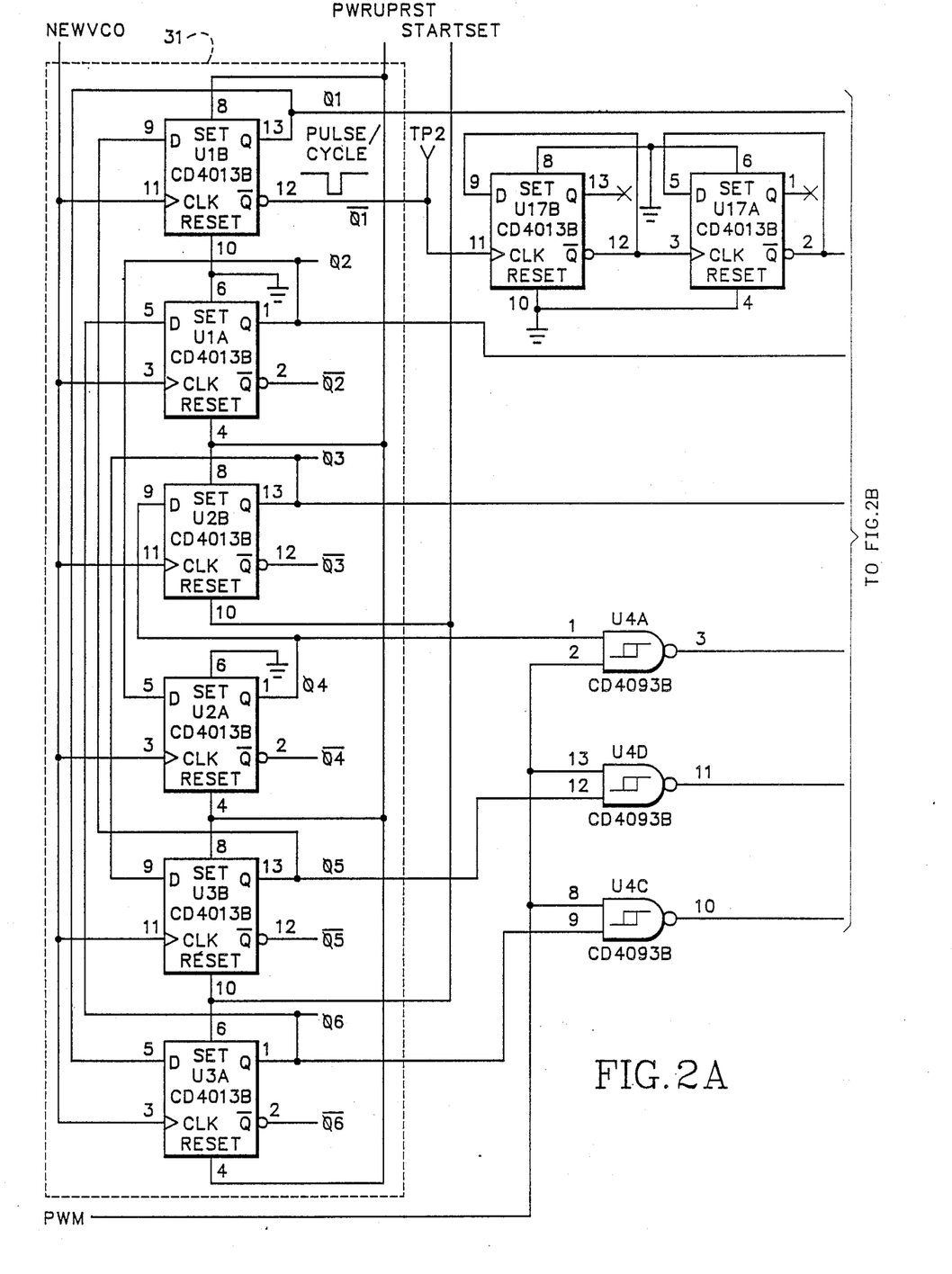
FIGS. 2A and 2B are, taken together, a detailed schematic diagram of the FET drive sequencing and power sequencing circuit of FIG. 1.
Figure 2B:
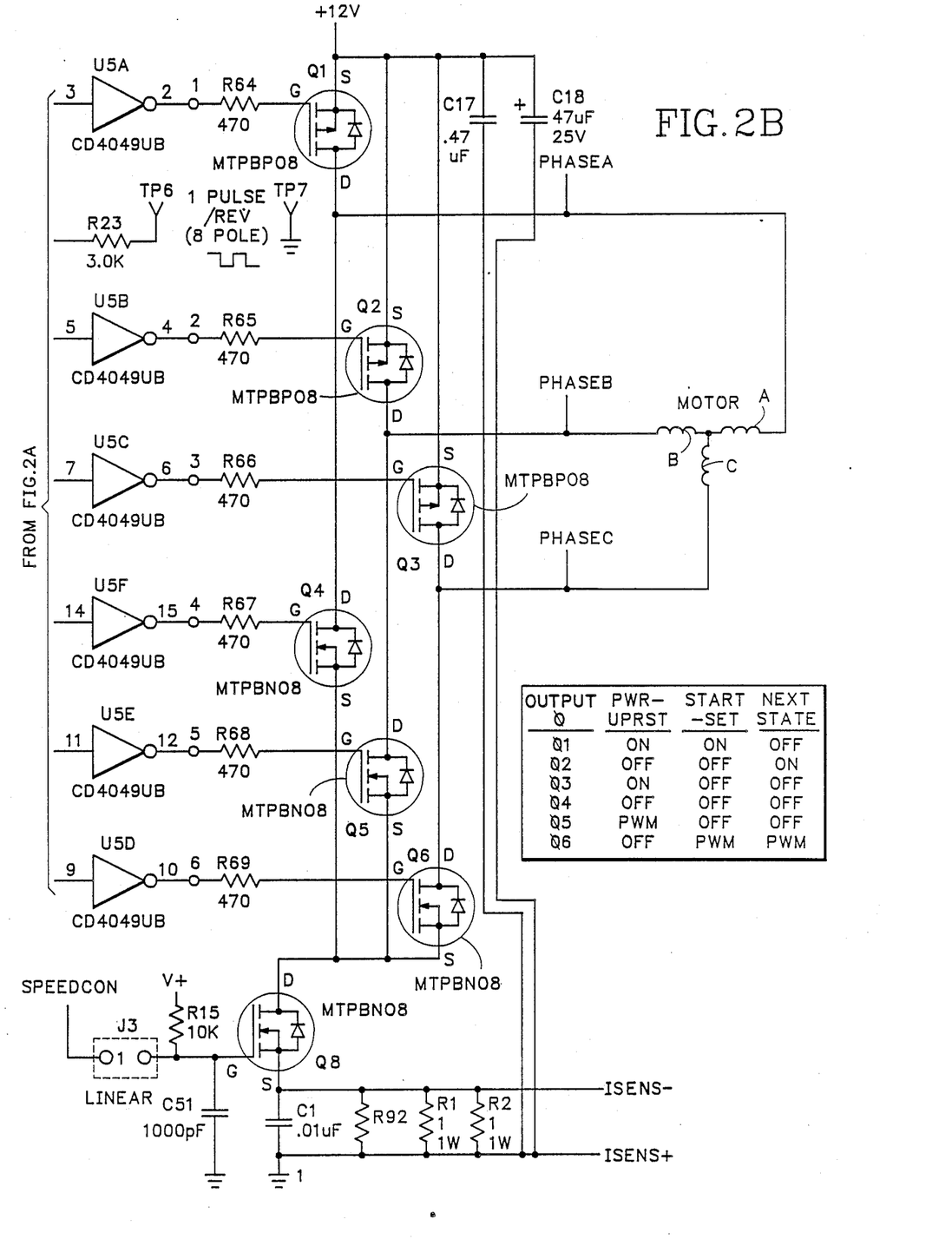

Referring now to FIGS. 2A and 2B, a set of D flip flops U1B, U1A, U2B, U2A, U3B, and U3A comprise a ring counter 31 which is driven by the output of the VCO 14 (labelled NEWVCO). Inputs to the ring counter 31 are the two outputs from the powerup, reset and start timing network 30, PWRUPRST and STARTSET. A set of inverter amplifiers U5A, U5B, U5C, U5F, U5E, and U5D connect the outputs of the ring counter 31 to FET drivers Q1, Q2, Q3, Q4, Q5 and Q6, respectively. In addition, pulse width modulation for speed control is provided to inverters U5F, U5E, and U5D through NAND gates U4A, U4D and U4C which have an input from the PWM generator 24.

Speed selection may also be provided by a connection through J3 to FET Q8 which controls the amount of current provided to the motor windings through FET's Q4, Q5 and Q6. Test points for testing the motor rpm are provided through D flip flops U17B and U17A.

Figure 5:
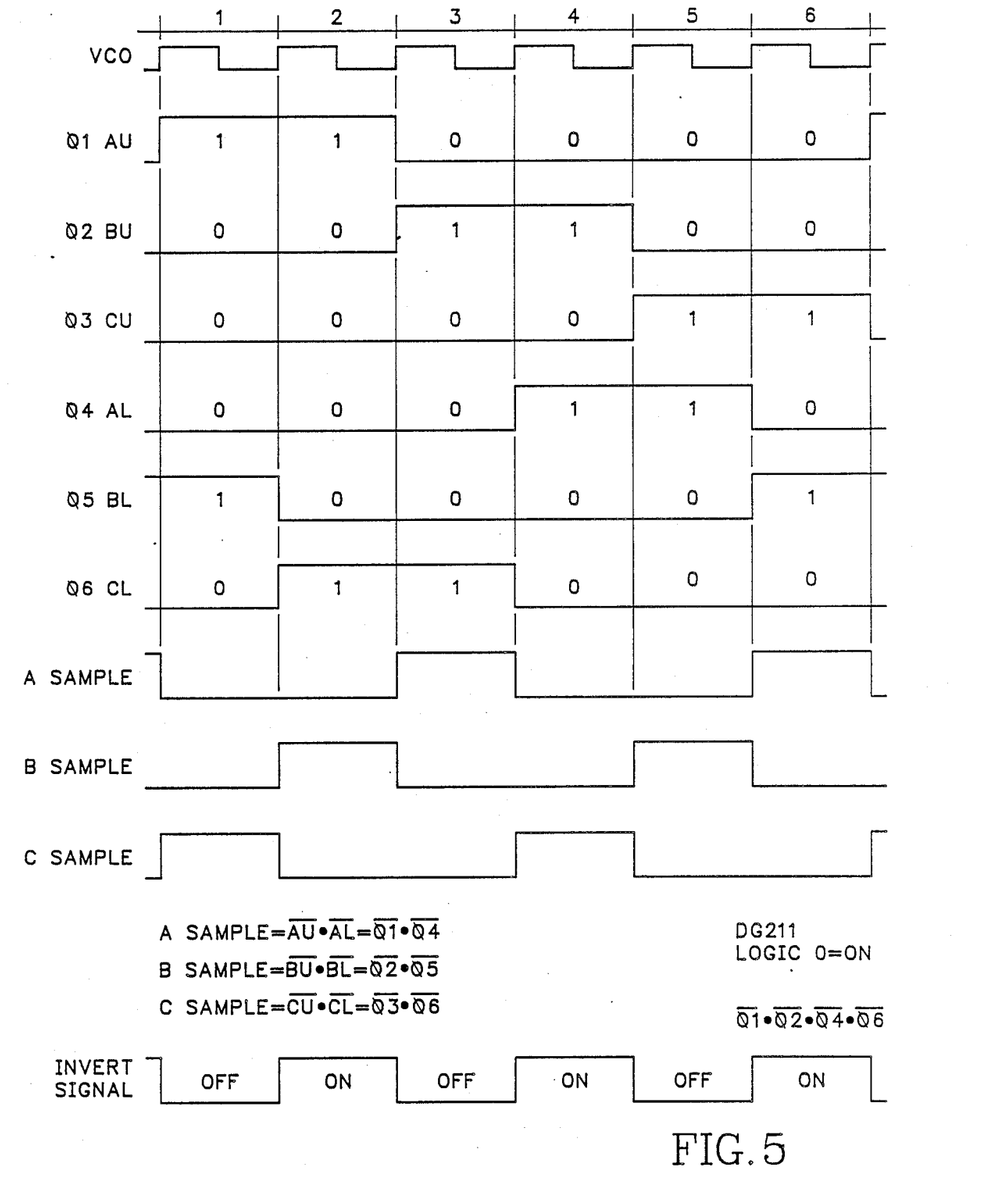
FIG. 5 is a waveform diagram illustrating the timing of the sequential energization of motor windings and the sampling of the back emf on unenergized motor windings.

The motor windings are energized in sequence by the FET's Q1-Q6 as shown in the timing diagram of FIG. 5. The period of the VCO (NEWVCO) is 6 cycles per revolution. As FIG. 5 shows, the windings are energized with currents flowing in both directions during each revolution. For example, while a current flows through phase A switched in by FET Q1, current flows in the opposite direction through phase B through FET Q5.

The sampling times for each of the three phases A, B and C are also shown in FIG. 5. The sample pulse is high when the winding is unenergized indicating that sampling is occurring. For each winding, this occurs during two VCO cycles in each revolution. At these times, when no current is flowing through a winding, the back emf across that winding may be sensed through pick-off tabs labeled PHASEA, PHASEB and PHASEC on FIG. 2 which provide signals representing the back emf's across these respective windings to resistors R76, R33 and R34, respectively, in FIG. 3A. These signals are summed through these resistors and are connected to pin 5 of U6B through a voltage scaling network comprising R38, R37 and R36. The PHASEA, PHASEB, and PHASEC signals are also connected through switches U14C, U14A and U14D, respectively, to the negative input (PIN 6) of amplifier U6B. The switches U14C, U14A and U14D are controlled by NAND gates U18C, U18A and U18B, respectively, which are, in turn, controlled by selected outputs from ring counter 31, arranged to close each switch when its associated winding is in an unenergized state. For example, switch U14C will close when the output of U18C is high. This will occur when ∅1 and ∅4 are both low. As FIG. 5 shows, this happens during the third and sixth clock periods of one complete revolution. The input to amplifier U6B on Pin 5 represents a center or null point for the motor windings A, B and C, and serves as a reference against which the back emfs on the unenergized windings may be measured.

Figure 3A:
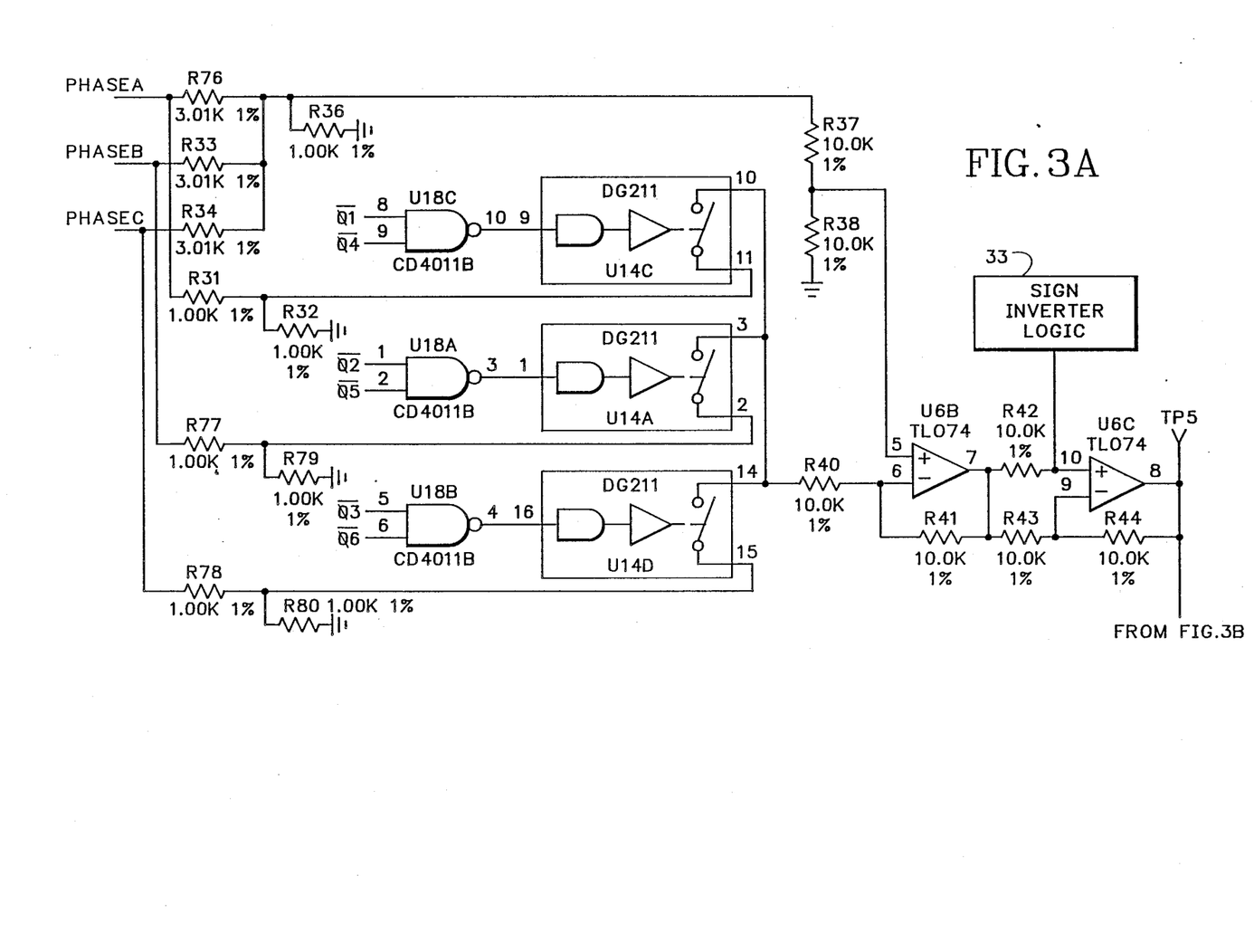
FIGS. 3A and 3B are, taken together, a detailed schematic diagram of the back emf sampling and error amplifier networks of FIG. 1.

The polarity of the back emf will alternate during the two clock periods that the winding is sampled. In order to maintain uniform polarity for the error signal, a sign inverter logic network 33 is connected to U6C which inverts the polarity of every other output of amplifier U6B. The sign inverter logic network 33 is driven by selected outputs of the D flipflops in ring counter 31 so that switch U14B closes every other sampling period and connects pin 10 of U6C to ground.

Figure 6:
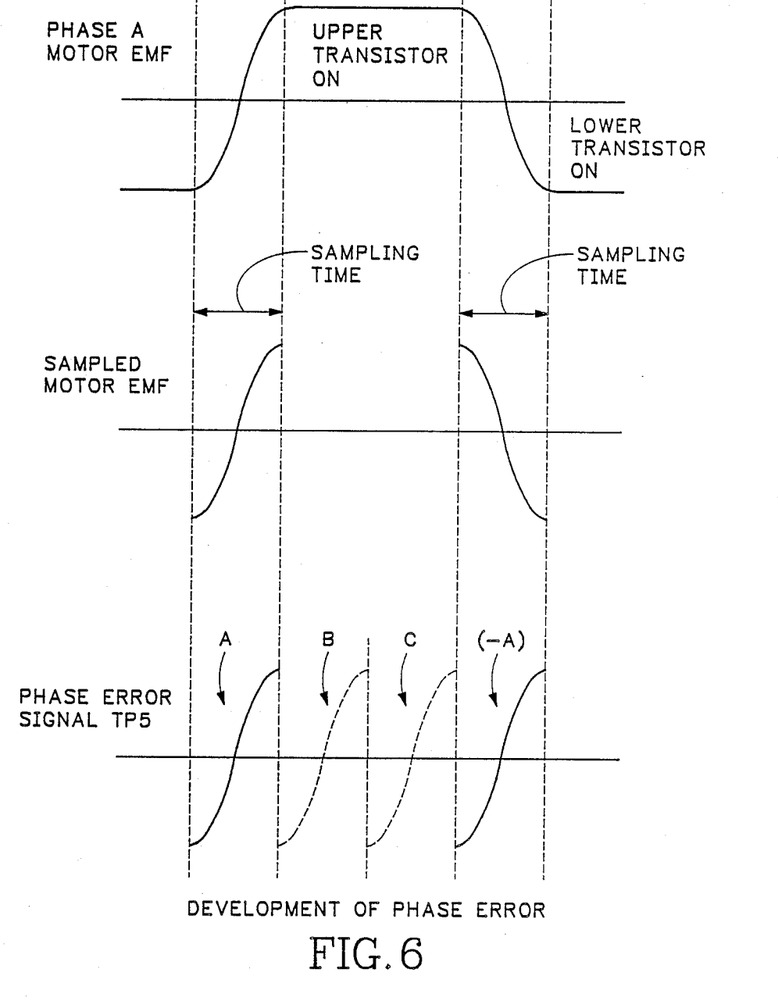
FIG. 6 is a waveform diagram illustrating the shape of the phase error signal when the motor emf is aligned with the inverter switching sequence.

An example of the waveforms observed in the circuit when the motor emf is properly aligned with the transistor switching is shown in FIG. 6.

Figure 3B:
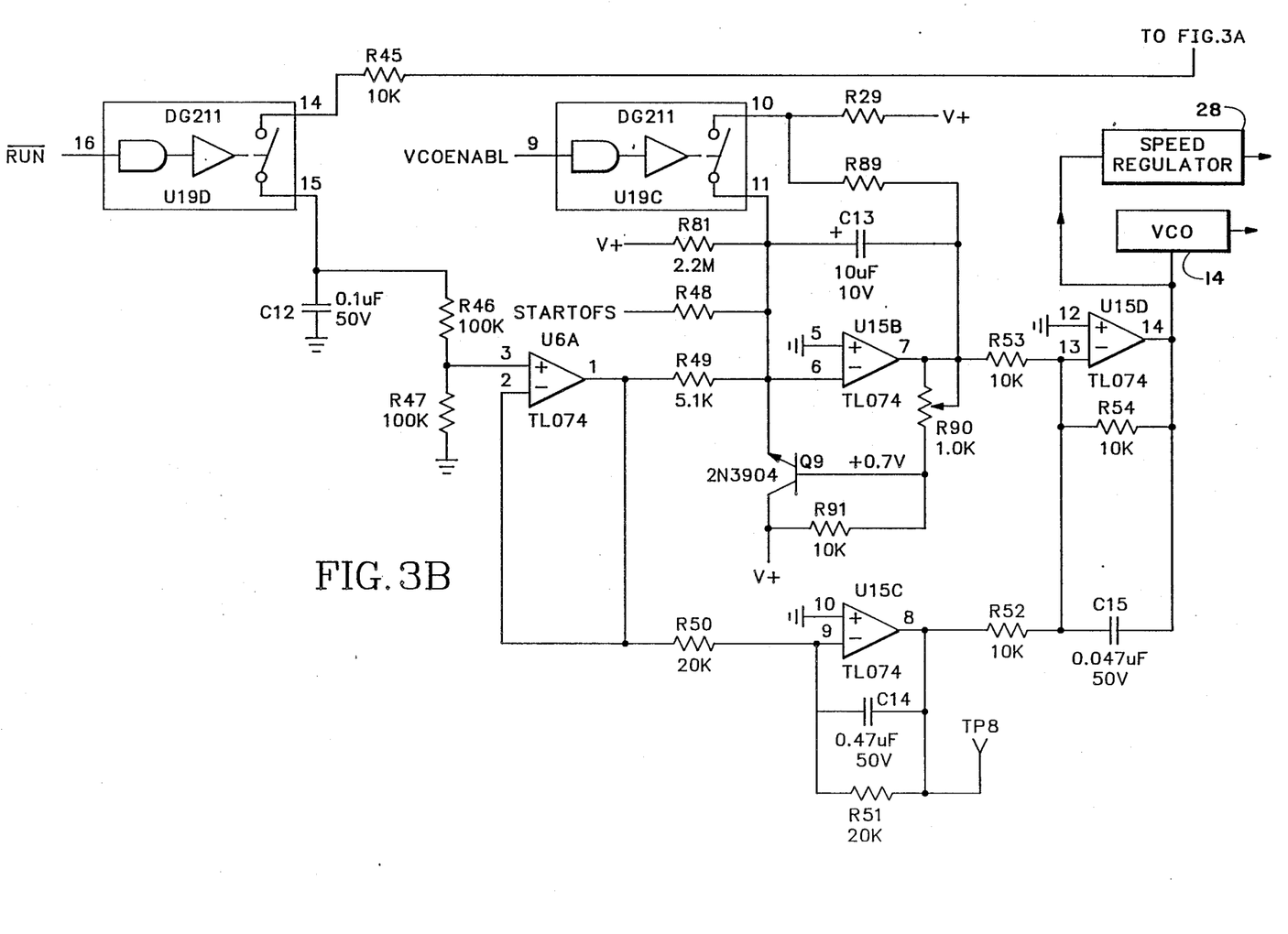

The error signal from the output of U6C is connected through switch U19D to the input of an integrator consisting essentially of amplifier U15B and feedback capacitor C13. A shunt resistor R89 may be connected across capacitor C13 through a switch U19C, the function of which will be explained below. Gain and high frequency stabilization is provided by amplifier U15C. Amplifier U6A is an impedance matching amplifier which brings the high impedance error amplifier signal down to a low impedance input for the integrator amp U15B. Amplifier U15D is a summer amplifier which sums the outputs of integrator amp U15B and gain amplifier U15C. The output of U15D is a slowly varying DC voltage which drives the voltage controlled oscillator 14. It also provides an output to the speed regulator network 28.

When the FET drive sequencing and power sequencing network 12 energizes the stator coils in the proper timing relation with respect to the rotor, the back emf sensed on each of the coils A, B and C produce a voltage output at amplifier U6C which is then converted into a VCO drive signal at the output of amplifier U15D. When the rotor begins to either lead or lag the stator, however, the voltage at the output of U15D will change in a direction tending to drive the VCO to cause the stator and rotor to realign. Due to the inherent memory of the integrator amp U15B and capacitor C13, the absence of any one back emf sample will not cause the FET drive sequencing 12 to lose control of the motor. The time constant of integration is such that a missed sample will not alter in any significant way the slowly varying DC voltage output of the amplifier U15D. Thus, the VCO cannot be driven so far out of phase so quickly as to cause loss of motor control. This is to be contrasted with the type of system shown in the Wright '435 patent described above, which depends upon reaching a threshold back emf in order to provide each switching signal for the commutator or inverter.

Figure 4:
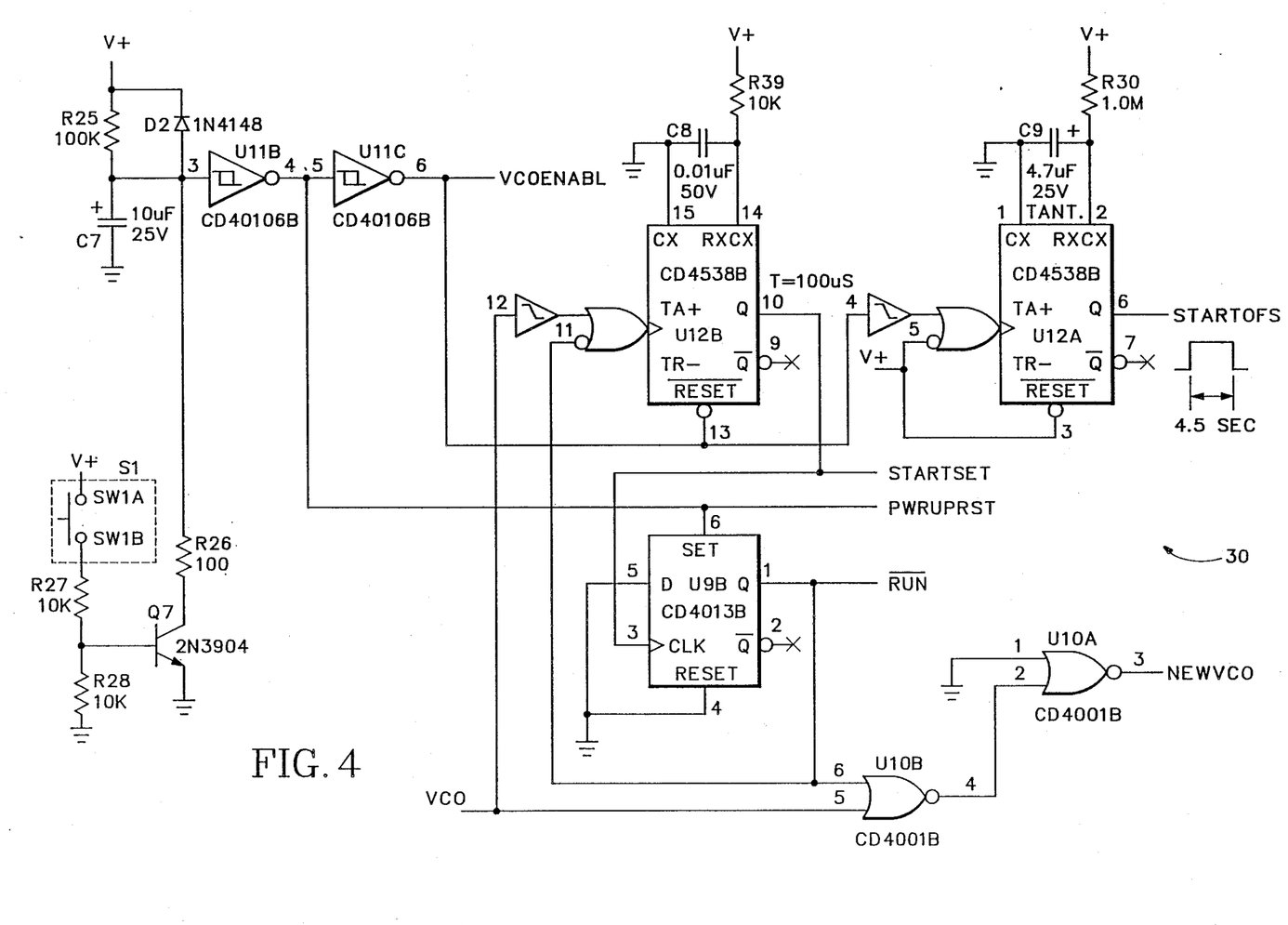
FIG. 4 is a detailed schematic diagram of the power up, reset, and start timing circuit shown in the block diagram of FIG. 1.

An automatic powerup, reset, and start timing circuit 30 is shown in FIG. 4. A switch S1 turns on transistor Q7 which causes current to flow through U11B and U11C providing the signal labeled VCOENABL. The signal VCOENABL is initially low. The power-up timing circuit R25, C7 and D2 hold VCOENABL low and PWRUPRST high for a time after power in initially applied. Switch S1 can also be used to initiate a start sequence. This signal appears at the input to U19C on FIG. 3 and closes that switch. This dissipates any charge that may be stored on capacitor C13, in effect resetting the integrator. The output of U11B is the PWRUPRST signal which appears at the input to the ring counter 31 of FIG. 2. This signal causes the D flip flops to set the initial position of the stator and rotor. That is, selected outputs of the ring counter turn on FET's Q1 and Q3, energizing coils A and C which cause the stator and rotor to align for maximum torque in preparation for the normal drive sequence. When the start timing capacitor C7 charges past the logic threshold of U11B, signal VCOENABL goes high and PWRUPRST goes low. The VCOENABL pulse at this time opens switch U19C and triggers one shot U12A. The output of one shot U12A is a 4.5 second pulse, STARTOFS, which appears as the input to R48 in FIG. 3. This steady state voltage causes the integrator U15B to ramp upwards thus accelerating the frequency of the VCO to a nominal value. As the VCO begins to oscillate, its output signal, VCO, appears as an input to NOR gate U10B and also appears at the trigger input to one shot U12B. The output of U12B is a 100 microsecond pulse which is the STARTSET signal, an input to the ring counter 31 of FIG. 2. This signal advances the ring counter 90° to a position corresponding to maximum torque of a DC brushless motor. The leading edge of this pulse is also the clock input to D flip flop U9B whose output is the $\overline{\text{RUN}}$ signal which closes switch U19D thus closing the stabilization feedback loop. The presence of the $\overline{\text{RUN}}$ signal also appears at the input to NOR gate U10B which enables the VCO signal to produce NEWVCO at the output of NOR gate U10A. Thus closing the switch S1 automatically aligns the stator and rotor, and immediately thereafter causes the integrator to ramp upwards driving the VCO toward its nominal operating frequency. The VCO, in turn, closes a switch enabling the stabilization feedback loop to begin operating.

As an alternative, in cases where a lesser degree of control is desired, it is possible to sample the back emf across a single winding and use only one such signal as an input to the integrator. In such a case, only one of the switches U14C, U14A or U14D in FIG. 3 would be needed, and sampling would occur during two clock periods of each motor revolution. This might be desirable, for example, in motors which are used in electric fans and other similar devices that do not require a high degree of stabilization.

The terms and expressions which have been employed herein are used as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A brushless electrical rotary machine having a rotor and a stator and including a plurality of windings driven by a multiphase inverter for selectively energizing said windings in sequence, comprising:
   (a) a phase detector having sampling means, including switching means responsive to said multiphase inverter, for sampling the back emf across at least one of said windings only during a period of time when said winding is normally not energized, said sampling means producing a phase error signal;
   (b) integrator means responsive to said phase error signal for producing a drive signal; and
   (c) oscillator means responsive to said drive signal for controlling the frequency at which said multiphase inverter selectively energizes said windings.

2. The brushless electrical rotary machine of claim 1 wherein said sampling means includes a voltage sensing network continuously coupled to the outputs of said windings for establishing a null point.

3. The brushless electrical rotary machine of claim 1 wherein said integrator means includes a proportional gain amplifier.

4. The brushless electrical rotary machine of claim 2 wherein said voltage sensing network further comprises comparator amplifier means having a voltage output from said one of said windings as a first input and having a signal representing a voltage at said null point as a second input.

5. The brushless electrical rotary machine of claim 1 including starter means for aligning said stator relative to said rotor such that the stator flux produces maximum torque in said rotor when said stator windings are first energized.

6. The brushless electrical rotary machine of claim 5 wherein said starter means further includes start signal generator means for generating a start signal coupled to said integrator means to drive said oscillator means for a predetermined period of time.

7. The brushless electrical rotary machine of claim 6 wherein said start signal comprises a voltage applied to said integrator for said predetermined period of time thereby causing said integrator to provide a ramp output to said oscillator means to gradually increase the frequency thereof up to a nominal frequency.

8. A brushless electrical rotary machine having a rotor and a stator and including a plurality of windings selectively energized by a multiphase inverter comprising:
   (a) a phase detector for providing an error signal representing the difference between actual rotor position and commanded rotor position;
   (b) an integrator circuit responsive to the error signal for producing a drive signal;
   (c) a voltage controlled oscillator responsive to the drive signal for controlling the frequency of the multiphase inverter; and
   (d) a starter circuit comprising a pulse generator coupled to the integrator circuit for providing to the input of the integrator circuit a timed pulse at the beginning of a start sequence whereby the output of the integrator causes the voltage controlled oscillator to increase its frequency from a start condition to a nominal operating frequency.

9. The brushless electrical rotary machine of claim 8 wherein said start circuit means includes pulse circuit means for supplying signals to said multiphase inverter to energize selected windings for a brief period of time thereby drawing said rotor into a preferred alignment position with respect to said stator.

10. The brushless electrical rotary machine of claim 8, further including a stabilization feedback loop connected between the respective windings and said voltage controlled oscillator for controlling the multiphase inverter so that maximum torque is maintained at any motor sped.

11. The brushless electrical rotary machine of claim 9, further including a stabilization feedback loop and switch means responsive to said starter circuit for enabling said loop after said ramp signal is provided to said voltage controlled oscillator.

* * * * *

UNITED STATES PATENT AND TRADEMARK OFFICE
CERTIFICATE OF CORRECTION

PATENT NO. : 4,928,043

DATED : May 22, 1990

INVENTOR(S) : Allan B. Plunkett

It is certified that error appears in the above-identified patent and that said Letters Patent is hereby corrected as shown below:

Col. 6, line 33, change "in" to --is--.

Col. 6, lines 63 & 65, change "$\overline{RUN}$signal" to --$\overline{RUN}$ signal--.

Signed and Sealed this

Eighth Day of October, 1991

Attest:

HARRY F. MANBECK, JR.

*Attesting Officer*        *Commissioner of Patents and Trademarks*